US007931527B2

(12) United States Patent
Caissie et al.

(10) Patent No.: US 7,931,527 B2
(45) Date of Patent: Apr. 26, 2011

(54) VIDEO POKER DRAW GAME

(76) Inventors: Daniel Caissie, St-Antoine (CA); Stephane Caissie, St-Antoine (CA); Wesley Davis, Notre-Dame (CA)

( * ) Notice: Subject to any disclaimer, the term of this patent is extended or adjusted under 35 U.S.C. 154(b) by 819 days.

(21) Appl. No.: 11/635,913

(22) Filed: Dec. 7, 2006

(65) Prior Publication Data

US 2007/0135196 A1 Jun. 14, 2007

Related U.S. Application Data

(60) Provisional application No. 60/749,006, filed on Dec. 8, 2005.

(51) Int. Cl.
*G06F 17/00* (2006.01)

(52) U.S. Cl. .......................................................... 463/13

(58) Field of Classification Search .................. 463/1–9, 463/13, 25, 40–42; 273/274, 292
See application file for complete search history.

(56) References Cited

U.S. PATENT DOCUMENTS 4,448,419 A 5/1984 Telnaes
5,456,465 A 10/1995 Durham
5,569,082 A 10/1996 Kaye
5,709,603 A 1/1998 Kaye
6,146,271 A * 11/2000 Kadlic ............................ 463/13
6,270,405 B1 * 8/2001 Ferguson ......................... 463/13
6,474,645 B2 * 11/2002 Tarantino ....................... 273/274
6,565,432 B2 5/2003 Moody
6,729,961 B1 5/2004 Millerschone
6,749,500 B1 6/2004 Nelson et al.
6,857,957 B2 2/2005 Marks et al.
7,785,182 B2 * 8/2010 Thomas et al. ................. 463/11
7,803,043 B2 * 9/2010 Jackson .......................... 463/13
2003/0038425 A1 * 2/2003 Tarantino ....................... 273/274
2004/0017043 A1 1/2004 Moody
2004/0224743 A1 * 11/2004 Tarantino ........................ 463/11
2006/0211468 A1 * 9/2006 Flint et al. ........................ 463/16
2007/0135193 A1 * 6/2007 Nicely ............................ 463/11
2008/0111309 A1 * 5/2008 Nicely et al. .................. 273/292
2008/0252011 A1 * 10/2008 Bickley et al. ................ 273/292
2010/0105467 A1 * 4/2010 Stone ............................. 463/22

* cited by examiner

*Primary Examiner* — Ronald Laneau
(74) *Attorney, Agent, or Firm* — Sullivan & Worcester LLP; Christopher T. McWhinney

(57) ABSTRACT

A method and apparatus for conducting a wagering game is provided. The method may comprise predetermining a predetermined payout award. The method may also comprise displaying a first hand, where the first hand includes a first plurality of cards. The method may also comprise accepting a selection of held cards selected from the first hand. The method may also comprise displaying a second hand, where the second hand includes a second plurality of cards including the held cards. The method may also comprise determining a third hand, where the third hand including a third plurality of cards so that at least one of the second hand and the third hand provides the predetermined payout award. The method may also comprise displaying the third hand. The method may also comprise awarding the predetermined payout award to a player.

33 Claims, 11 Drawing Sheets

Fig 5

400

| WIN CATEGORY (402) | BET 1 (404) | BET 2 (406) | BET 3 (408) | BET 5 (410) | BET 10 (412) | |
|---|---|---|---|---|---|---|
| ROYAL FLUSH | 250 | 500 | 750 | 4000 | 10000 | 420 |
| STRAIGHT FLUSH | 60 | 120 | 180 | 300 | 600 | 420 |
| 4 OF A KIND | 25 | 50 | 75 | 125 | 250 | 420 |
| FULL HOUSE | 9 | 18 | 27 | 45 | 90 | 420 |
| FLUSH | 6 | 12 | 18 | 30 | 60 | 420 |
| STRAIGHT | 4 | 8 | 12 | 20 | 40 | 420 |
| 3 OF A KIND | 3 | 6 | 9 | 15 | 30 | 420 |
| 2 PAIR | 2 | 4 | 6 | 10 | 20 | 420 |
| JACKS OR BETTER | 1 | 2 | 3 | 5 | 10 | 420 |

Fig. 7a

700

| Play ID | Terminal ID | Player ID | Hand ID | Date and Time | Pre-Determined Prize Award |
|---|---|---|---|---|---|
| 1 | 2515 | 261 | 1886 | 8/15/05 1601 | $50 |
| 2 | 2778 | 8402 | 6391 | 8/18/05 1332 | $0 |
| 3 | 4687 | 5443 | 6547 | 8/19/05 1233 | $0 |
| ... | ... | ... | ... | ... | ... |

702 702 702

Fig. 7b 704 706 708 710 712 714

| | | | | | |
|---|---|---|---|---|---|
| 1 | 7969 | 3631 | 6235 | 8/15/05 1601 | $50 |

702'

Fig. 8a

800

| Terminal ID | Terminal Type | Location | Date Installed |
|---|---|---|---|
| 1 | 5 | 964 | 1/4/02 |
| 2 | 4 | 593 | 3/11/03 |
| 3 | 2 | 696 | 4/23/03 |
| ... | ... | ... | ... |

802 802 802

Fig. 8b 804 806 808 810

| | | | |
|---|---|---|---|
| 3 | 2 | 485 | 4/23/03 |

802'

VIDEO POKER DRAW GAME

The present application claims the benefit of U.S. Provisional Patent Application Ser. No. 60/749,006, filed Dec. 8, 2005, titled "System and Method for Draw Game". The entire disclosure of said provisional application is incorporated herein by reference thereto.

BACKGROUND

Wagering games such as video draw poker games allow a player to make a wager and receive five cards face up as a first hand. The player selects which cards, if any, to hold. Cards not held by the player are discarded. Replacement cards are then provided to replace the discarded cards. A second hand is the final five cards including the held cards and the replacement cards. The second hand the player's poker hand. The second hand is analyzed to determine its poker hand ranking. The player is paid any winnings based on the poker hand ranking of the second hand and the wager made.

An alternative game would be a video stud poker game. In a video stud poker game, a player first makes a wager. The player is then dealt five cards that comprise a player's hand. The player does not have an opportunity to select cards to be held or to receive replacement hands. The player's hand is analyzed to determine its poker hand ranking. The player is paid any winnings based on the poker hand ranking and the wager made.

The poker hand ranking of each poker hand is communicated to the player in a poker hand table. A poker hand table may include a set of poker hands and their respective winnings. For example, a royal flush may win an award of five hundred times the wager.

BRIEF DESCRIPTION OF THE DRAWINGS

FIG. 5 illustrates an example payout structure, in accordance with an example embodiment of the present invention.

FIG. 7*a* illustrates an example play log, in accordance with an example embodiment of the present invention.

FIG. 7*b* illustrates an example play log entry, in accordance with an example embodiment of the present invention.

FIG. 8*a* illustrates an example terminal structure, in accordance with an example embodiment of the present invention.

FIG. 8*b* illustrates an example terminal structure entry, in accordance with an example embodiment of the present invention.

DETAILED DESCRIPTION OF EXAMPLE EMBODIMENTS

Figure 1:
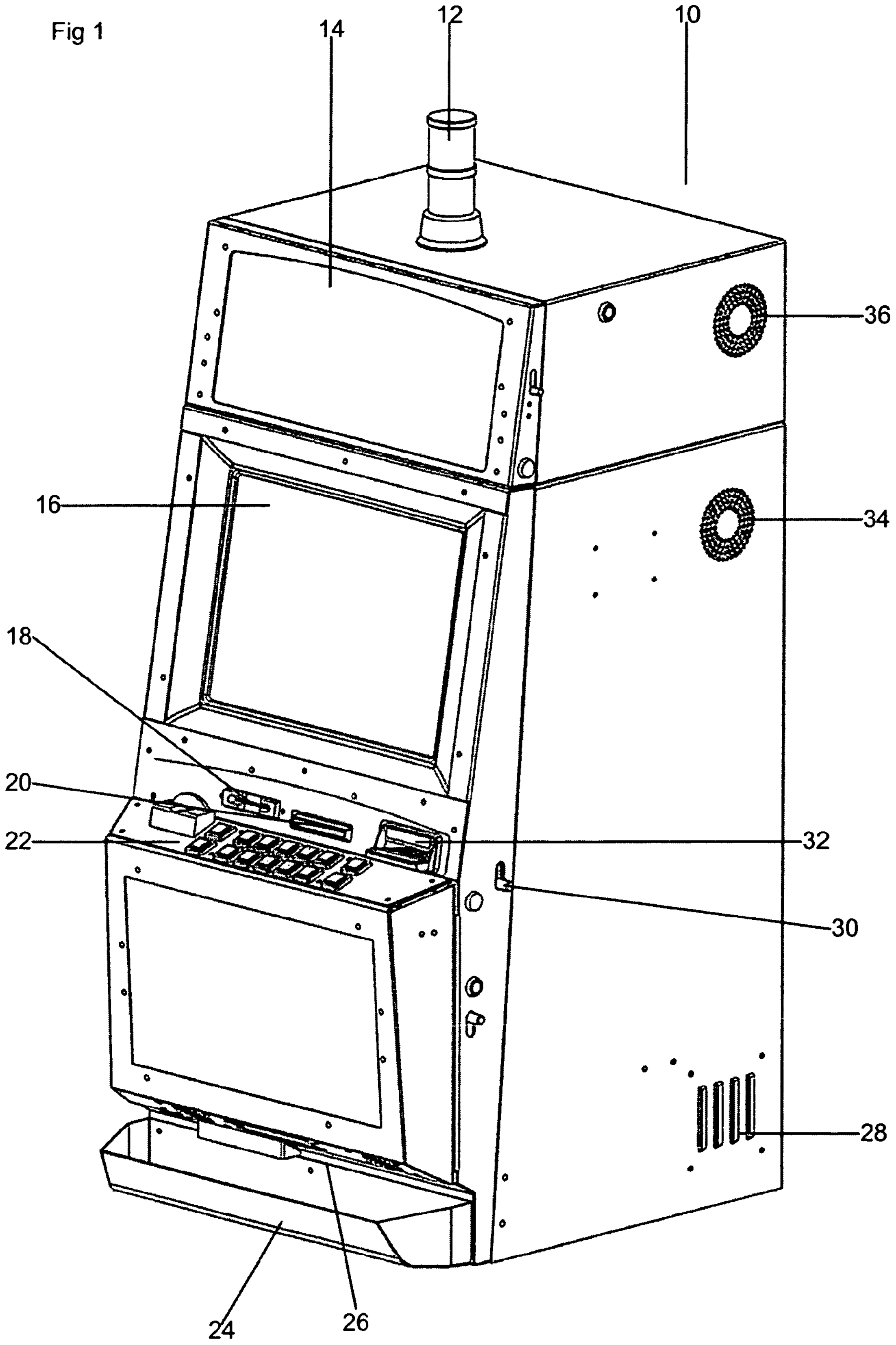
FIG. 1 illustrates an example video gaming machine, in accordance with an example embodiment of the present invention.

A variety of wagering games predetermine the winnings of a game after a wager is made by the player but before any game result is provided to the player. From the predetermined winnings and the player's wager, it can be determined what game result and input is to award the predetermined winnings. However, in a video draw poker game, it is possible for a player to select held cards which make it impossible for a final hand to be provided based on the player's first hand and selection cards to hold. For example, a player may make poor decisions or play a low-probability choice. In such cases, no set of replacement cards may be selected to provide a poker hand with the necessary ranking to award the predetermined winnings.

For this reason, there may be inconsistencies between the player's selection of cards to be held and the second hand necessary to award the predetermined winnings. This inconsistency has prevented the use of predetermined results in video draw poker games.

Some example embodiments of the present invention generally relate to wagering games providing a predetermined prize. The wagering game may include a video poker game including a draw poker hand and a stud poker hand. The wagering game may predetermine a predetermined prize before results are displayed to a player. A player may receive a first hand in the video poker game and selects cards to be held. The cards which are not held by the player may be replaced. A second hand may include the cards held by the player and any replacement cards. A third hand for the video poker game may be determined such that either the second hand or the third hand provides the predetermined prize in conjunction with the player's wager. This third hand may then be displayed to the player and the predetermined prize awarded to the player. The predetermined prize may be guaranteed to be awarded to the player regardless of the player's selection of held cards.

In one example embodiment of the present invention, a procedure may be provided for conducting a wagering game. A payout award may be specified. A first hand may be displayed. A selection of held cards may be selected from the first hand. A second hand may be displayed. A third hand may be determined so that either the second hand or the third hand provides the payout award. The payout award may be awarded to the player. The first hand may include a first set of cards. The second hand may include a second set of cards including the held cards. The third hand may include a third set of cards. A payout award may be award to the player. The payout structure may include entries associated with payout awards. A winning hand selected from the second hand and the third hand may be highlighted. The wagering game may be a video poker game. A winning hand may be selected from one of the second hand and the third hand and a winning hand's poker hand value may be higher than a non-winning hand's poker hand value. The first hand may be determined to not award a payout award higher than the specified payout award for any selection of held cards. The procedure may further include determining the third hand so that the second or third hand provides the second specified payout award. The procedure may further include receiving a wager amount from the player. The procedure may further include receiving an indication of a desire to play the wagering game. The procedure may further include providing a bonus round in the wagering game as the specified payout award.

In another example embodiment of the present invention, a procedure may be provided to conduct a wagering game. The procedure may include specifying a payout award, displaying a first game result, accepting a player's choice altering the first game result, displaying a second game result, determining a third game result so that the second game result or the third game result provides the specified payout award, displaying the third game result, and providing the specified payout award to a player. The second game result may incorporate the player's choice. The procedure may further include communicating a payout structure to the player, the payout structure including payout structure entries associated with payout awards. The first game result may be determined to not award a payout award higher than the specified payout award for any player's choice. The procedure may further include receiving a wager amount from the player. The procedure may further include receiving an indication of a desire to play the wagering game.

In another example embodiment of the present invention, an apparatus may be provided for conducting a wagering game, including a display, an input module, and a processor. The display may be configured to display a payout structure, a first poker hand, a second poker hand, and a third poker hand. The input module may be configured to receive a player's indication of a desire to play the wagering game and a player's selection of held cards selected from the first poker hand. The processor may be configured to choose a payout structure entry associated with a specified payout award, determine the first poker hand, determine the second poker hand from the first poker hand and the selection of held cards, determine the third poker hand so that at least one of the second poker and the third poker hand provides the specified payout award associated with the payout structure entry, and awarding the specified payout award to the player. The apparatus may also include a dispenser configured to dispense the specified payout award. The payout structure may include payout structure entries associated with payout awards.

In another example embodiment of the present invention, an apparatus may be provided for conducting a wagering game, the apparatus including a payout structure, a display, an input module, a dispenser and a processor. The payout structure may include payout structure entries associated with payout awards. The display may be configured to display the payout structure, a first game result, a second game result, and a third game result. The input module may be configured to receive a player's indication of a desire to play the wagering game and a player's choice. The dispenser may be configured to award the specified payout award. The processor choose a payout structure entry from the payout structure, determine the first game result, determine the second game result from the first game result and the player's choice, and determine the third game result so that the second game result or the third game result provides the specified payout award. The payout structure further comprises payout structure entries, associated with payout awards. Another example embodiment of the present invention, a computer-readable medium storing instructions adapted to be executed by a processor, the instructions, when executed, defining a procedure for conducting a wagering game. A payout award may be specified. A first hand may be displayed. A selection of held cards may be selected from the first hand. A second hand may be displayed. A third hand may be determined so that either the second hand or the third hand provides the payout award. The payout award may be awarded to the player. The first hand may include a first set of cards. The second hand may include a second set of cards including the held cards. The third hand may include a third set of cards. A payout award may be award to the player.

In another example embodiment of the present invention, a procedure may be provided to conduct a wagering game. The procedure may include specifying a payout award at a server, displaying a first hand at a terminal, accepting a selection of held cards selected from the first hand, displaying a second hand at the terminal, displaying the third hand at the terminal, highlighting a selected winning hand at the terminal from the second hand and the third hand, awarding the specified payout award at the terminal. The first hand may include a first plurality of cards. The terminal may be in communication with the server. The second hand may include a second plurality of cards including the held cards. The third hand may include a third plurality of cards such that at least one of the second hand and the third hand provides the specified payout award.

In another example embodiment of the present invention, a procedure may be provided for conducting a wagering game. The procedure may include displaying a first hand, accepting a selection of held cards selected from the first hand, displaying a second hand, displaying the third hand, and awarding a payout award to a player. The first hand may include a first plurality of cards. The second hand may include a second plurality of cards including the held cards. The payout award may be associated with a highest poker hand value of the second hand and the third hand.

In another example embodiment of the present invention, a procedure may be provided for conducting a wagering game. The procedure may include predetermining a predetermined payout award, displaying a first hand, accepting a selection of held cards selected from the first hand, displaying a second hand, determining a third hand, displaying the third hand, and awarding the predetermined payout award to a player. The first hand may include a first plurality of cards. The second hand may include a second plurality of cards including the held cards. The third hand may include a third plurality of cards so that one of the second hand, the third hand, or a combination of both hands provides the predetermined payout award.

In another example embodiment of the present invention, a procedure may be provided for conducting a wagering game. The procedure may include predetermining a predetermined payout award, displaying a first hand, accepting a selection of held cards selected from the first hand, displaying a second hand, displaying a third hand, if neither the second hand nor the third hand provides the predetermined payout award, providing at least one bonus hand, wherein a sum of a prize associated with the second hand and the third hand and a prize associated with the bonus hand equals the predetermined payout award, and awarding the predetermined payout award to a player. The first hand may include a first plurality of cards. The second hand may include a second plurality of cards including the held cards. The third hand may include a third plurality of cards.

FIG. 1 illustrates an example video gaming machine, in accordance with an example embodiment of the present invention. A video gaming machine 10 may be configured to conduct a wagering game. For example, a wagering game may be a slot machine game, a lottery, a video game, or another game of chance involving a wager. For example, the video gaming machine 10 may be a video poker game terminal, a video wagering game terminal, a video lottery terminal (VLT), a video slot machine, or a video game terminal. The video gaming machine 10 may be in communication with a server.

The video gaming machine 10 may include a blinker 12. The blinker 12 may enclose a light configured to blink on and off. For example, the blinker 12 may be configured to blink when a large prize is awarded from the video gaming machine 10.

The video gaming machine 10 may include a lighted display 14. For example, the lighted display 14 may include a logo, a game name or other visually attractive graphics. The lighted display 14 may alternatively be a liquid crystal display screen.

The video gaming machine 10 may include display screen 16. The display screen 16 may be a liquid crystal display screen (LCD) or a cathode ray tube (CRT) screen. For example, the display screen 16 may enclose a viewable display area visible to a player. Alternatively, the display screen 16 may be a touch screen, able to accept player inputs of touching the screen.

The video gaming machine 10 may include a credit card accepter 18, a player's card accepter 20 and a currency accepter 32. For example, the credit card accepter 18 may accept a credit card or a debit card for a player's wager. For example, the player's card accepter 20 may accept a frequent player's card. The frequent player's card may include a player's identifying information and wager history. Alternatively, the frequent player's card may include an identifier that is associated with a player's identifying information and wager history. The currency accepter 32 may be configured to accept cash bills in various denominations for a player's wager.

The video gaming machine 10 may include input modules 22. For example, the input modules 22 may be a set of buttons. The input modules 22 may be configured to receive input from a player during a wagering game.

The video gaming machine 10 may include a dispenser tray 24 and a dispenser 26. The dispenser 26 may be configured to dispense a prize. For example, a prize may be currency or a prize receipt redeemable at a cashier. The dispenser tray 24 may be configured to catch the prize after it is dispensed.

The video gaming machine 10 may include openings 28, 34 and 36. Opening 28 may be configured to allow ambient air to circulate into and out of an interior of the video gaming machine 10. Openings 34 and 36 may be configured to allow sound through.

Figure 2:
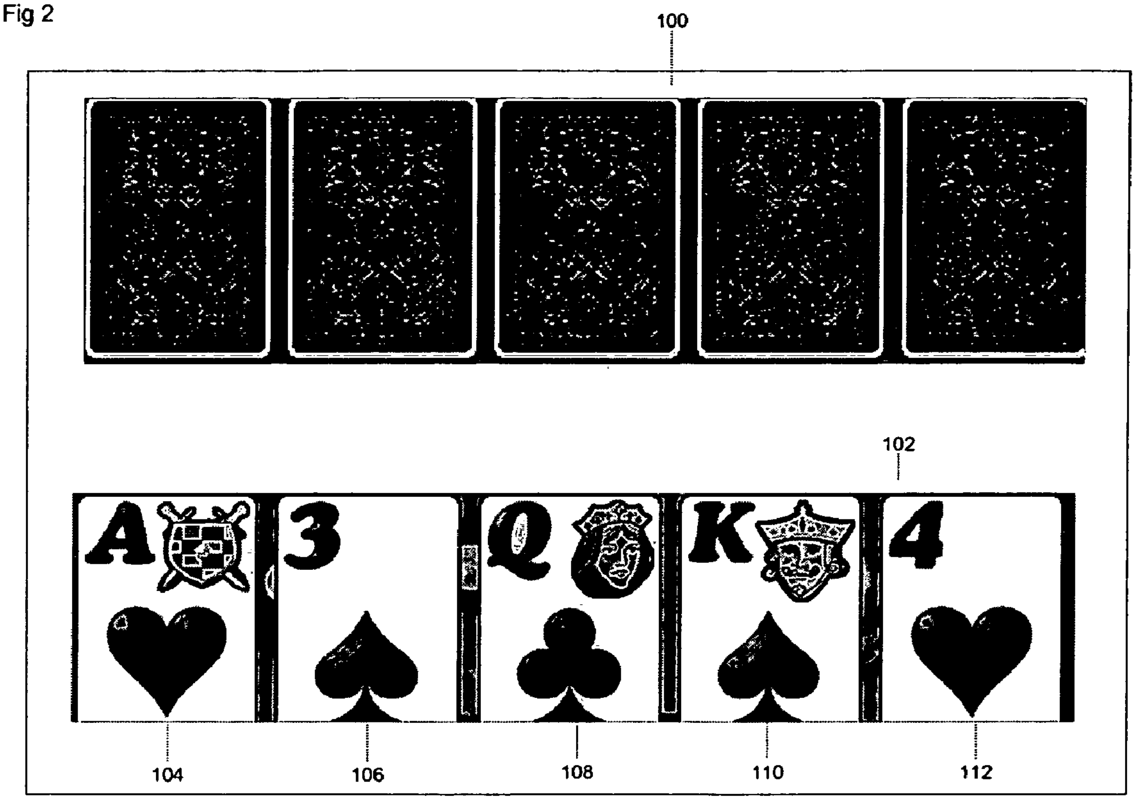
FIG. 2 illustrates an example screen shot depicting a first poker hand and an undealt third hand, in accordance with an example embodiment of the present invention.
Figure 6:
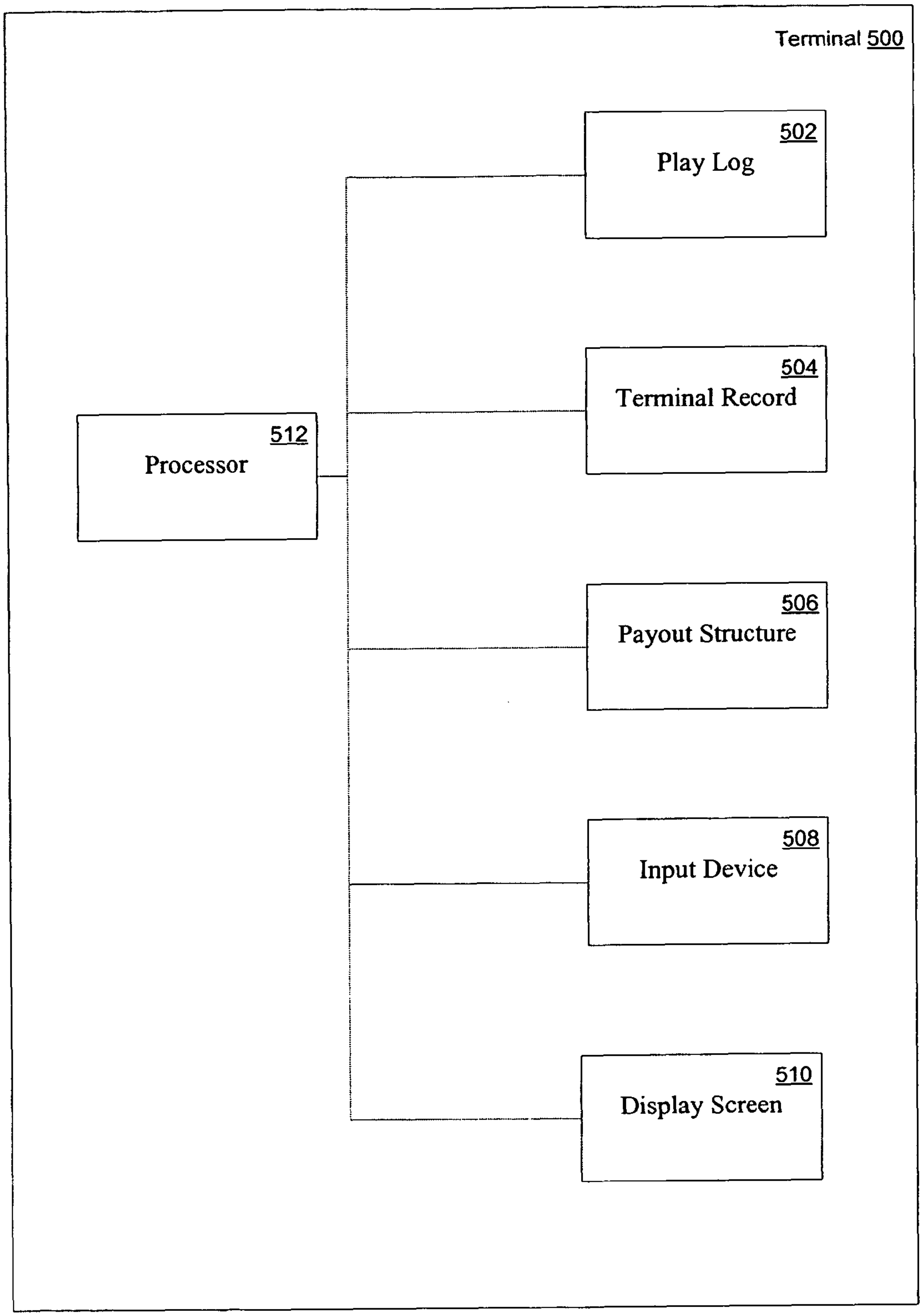
FIG. 6 illustrates an example system for conducting a wagering game, in accordance with an example embodiment of the present invention.

FIG. 2 illustrates an example screen shot depicting a first poker hand and an undealt third hand, in accordance with an example embodiment of the present invention. For example, the example screen shot may be displayed on a display screen 16 as depicted in FIG. 1. A first poker hand 102 may be dealt to a player and displayed. For example, the video game terminal may be as depicted in FIGS. 1 and 6. The first poker hand 102 may comprise a first set of cards 104, 106, 108, 110 and 112. The first set of cards 104, 106, 108, 110 and 112 may be dealt from a first standard 52-card deck. For example, the first set of cards 104, 106, 108, 110 and 112 may be selected from the first standard 52-card deck in a non-random manner, the non-random manner configured to provide a predetermined winning.

An undealt third hand 100 may be displayed to the player. The undealt third hand 100 may be dealt from a second standard 52-card deck. For example, the undealt third hand 100 may be selected from the second standard 52-card deck in a non-random manner, the non-random manner configured to provide a predetermined winning. Values of the cards in the undealt third hand 100 may be determined when the first poker hand 102 is displayed or later. For example, a later time to determine values of the cards in the undealt third hand 100 may be before the cards of the third hand 100 are revealed in FIG. 4.

Figure 3:
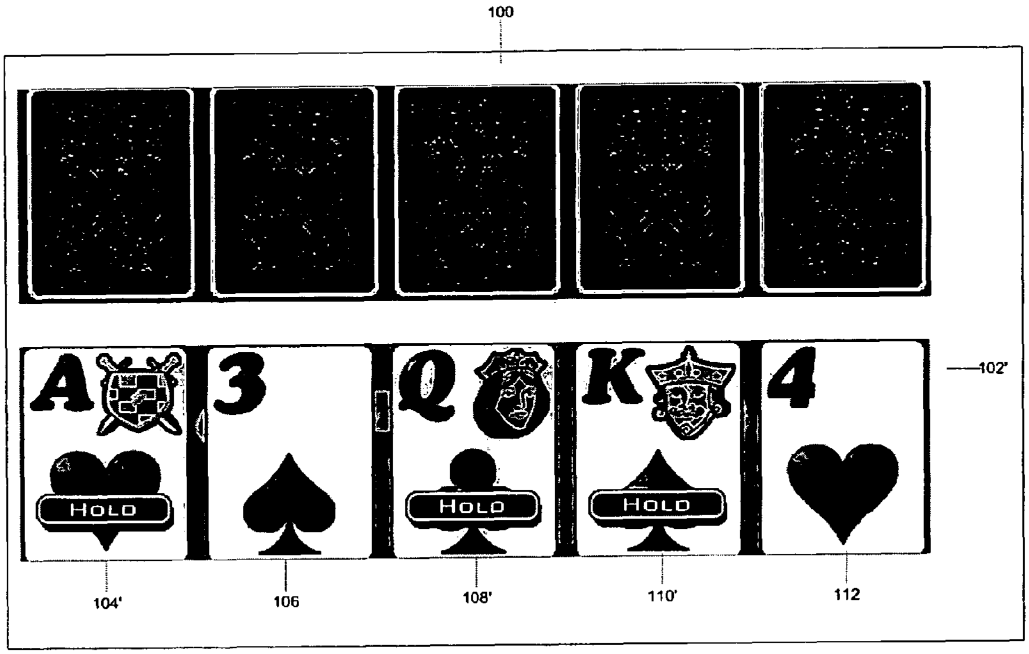
FIG. 3 illustrates an example screen shot depicting first poker hand with a selection of held cards and an undealt third hand, in accordance with an example embodiment of the present invention.

FIG. 3 illustrates an example screen shot depicting first poker hand with a selection of held cards and an undealt third hand, in accordance with an example embodiment of the present invention. A player may select a set of held cards from the first hand 102 depicted in FIG. 2. A first poker hand 102' may reflect the selection of held cards. The selection of held cards may be cards 104', 108' and 110'. A card selected to be held may include a text or graphic "hold" to indicate the card has been selected to be held. For example, the player may select cards by inputting his choices into an input method. For example, the input method may be a set of buttons include in the terminal. Alternatively, the player may select cards by directly tapping a touch screen display screen depicting the cards. The player may then input a confirmation of the selected cards into the input method.

Until the player inputs the confirmation of the selected cards, the player may unselect a card previously selected. For example, the player may unselect a card in a similar manner as the player may select a card. That is, the player may input his choice of an unselect card via the input method discussed above.

It will be appreciated that any input method that allows the player to select or unselect a card from the first poker hand 102' may be used. For example, a voice recognition system may be used as the input method.

The first poker hand 102' may include the cards 106 and 112 and the held cards 104', 108' and 110'. The held cards 104', 108' and 110' may be the same as cards 104, 108 and 110 depicted in FIG. 1 except they are designated as being held by the player.

An undealt third hand 100 may be displayed to the player. The undealt third hand 100 may be as depicted and described in FIG. 2.

Figure 4:
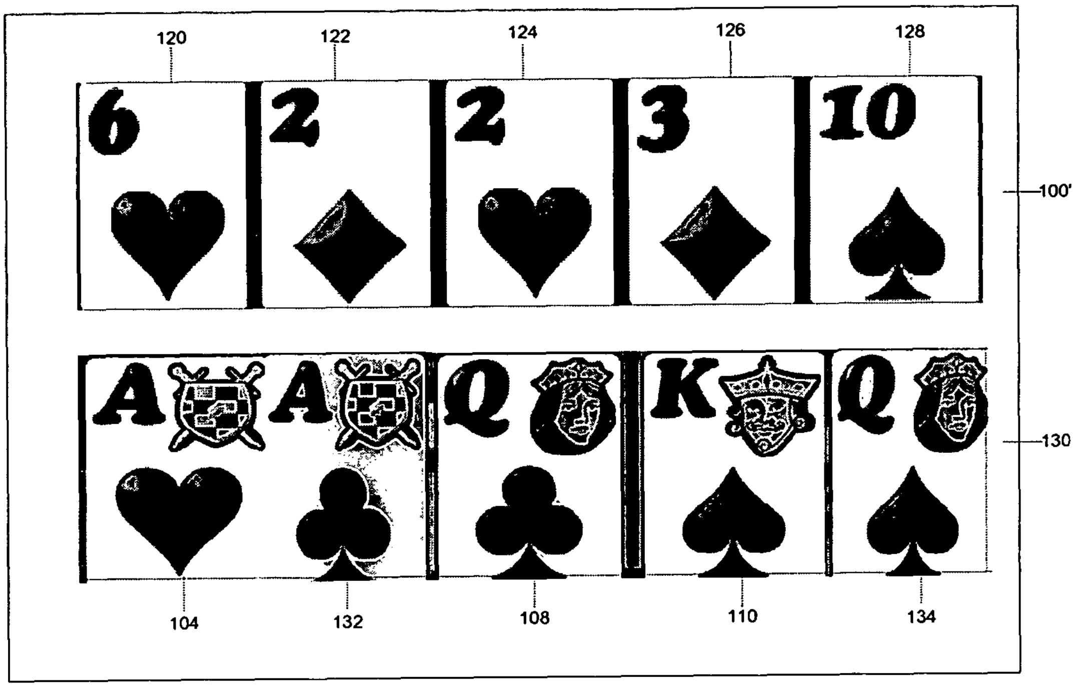
FIG. 4 illustrates an example screen shot depicting a second hand and a third hand, in accordance with an example embodiment of the present invention.

FIG. 4 illustrates an example screen shot depicting a second hand and a third hand, in accordance with an example embodiment of the present invention. A second hand 130 may include cards 104, 108 and 110. The cards 104, 108 and 110 were previously designated as held cards in FIG. 2. The held cards 104, 108 and 110 may have their held designation text or graphics (as depicted in FIG. 3) removed. The cards 106 and 112 (not depicted) of FIG. 3 may be discarded and replaced with replacement cards 132 and 134. The replacement cards 132 and 134 may be dealt from the first standard 52-card deck that the first hand was dealt from. For example, the replacement cards 132 and 134 may be selected from the first standard 52-card deck in a non-random manner, the non-random manner configured to provide a predetermined winning. The second hand 130 may include the replacement cards 132 and 134. Thus, the second hand 130 may include cards 104, 132, 108, 110 and 134. The second hand 130 as depicted in FIG. 3 may have a value of two pairs: a pair of kings and a pair of queens. It will be appreciated that enough replacement cards may be dealt to replace cards discarded by the player. For example, if the player chooses to hold 4 cards, only one replacement card will be dealt.

The third hand 100' may be dealt and the cards revealed to the player. The third hand 100' may be the same third hand 100 depicted in FIGS. 2 and 3. As described in FIG. 2, the values of the cards in the third hand 100 may be determined when the undealt hand is first displayed in FIG. 2. Alternatively, the values of the cards in the third hand 100' may be determined wren displayed in FIG. 4. As described in FIG. 2, the cards of the third hand 100' may be dealt from a second standard 52-card deck.

The third hand 100' may be a stud poker hand, with no player selection of held cards and no replacement of discarded cards. The third hand 100' as depicted in FIG. 3 may have a value of one pair: a pair of twos.

FIG. 5 illustrates an example payout structure, in accordance with an example embodiment of the present invention. A payout structure 400 may provide information on a winnings or prize associated with a wager and a poker hand. The payout structure 400 may include a column 402 of poker hands. The column 402 may list a set of poker hands eligible for winnings. The poker hands used in the column 402 may include conventional poker hands such as a royal flush, a straight flush, a four of a kind, full house, flush, straight, three of a kind, two pairs and pair of jacks or better.

The relative value of the poker hands may be conventional. For example, a royal flush may be the highest ranked poker hand, followed by a straight flush, a four of a kind, full house, flush, straight, three of a kind, two pairs and pair of jacks or better.

The definition of the poker hands may be conventional. For example, a pair of jacks or better may include five card hands with at least two cards of the same rank, for example, queens. The rank of the pair of cards may be configured to require a rank greater than jack. As a second example, a poker hand of two pairs may include five card hands with at least two sets of cards with the same rank.

It will be appreciated that the poker hands used in column 402 may be set by a game designer as desired. For example, the definition of the poker hands may be varied. The relative value of the poker hands may also be varied. In another example embodiment, each card may be assigned a value, and a value of a poker hand may be a sum of the values of each card. In another example embodiment, the value of the cards may be considered after the rank of a poker hand is determined. For example, a first straight flush comprising of higher value cards may be ranked higher than a second straight flush comprising of lower value cards. In this example embodiment, a straight flush comprising of the 7, 8, 9, 10, jack and queen of spades may rank higher than a straight flush comprising of the 2, 3, 4, 5 and 6 of spades. Similarly, another example embodiment may rank suits and consider the suits of the cards in determining the value of the poker hand.

The payout structure 400 may also include a set of rows 420. Each row 420 may be associated with a poker hand of column 402 and include the winnings or prize to be awarded for that poker hand and a given wager.

The payout structure 400 may also include a column 404 of one unit wager winnings or prize. The column 404 of one unit wager winnings may include a corresponding winning amount for each poker hand of column 402 when a player makes a one unit wager. For example, FIG. 4*a* depicts that a royal flush will provide the player with a 250 unit winning if the player had made a one unit wager.

Similarly, the payout structure 400 may also include a column 406 of two unit wager winnings, a column 408 of three unit wager winnings, column 410 of five unit wager winnings and a column 412 of ten unit wagers.

For example, a player's winning after receiving a full house on a three unit wager would be 27 units. FIG. 5 depicts that the row 420 corresponding to a full house poker hand indicates that a three unit wager would award a winnings of 27.

FIG. 6 illustrates an example system for conducting a wagering game, in accordance with an example embodiment of the present invention. A terminal 500 may be a conventional video gaming machine, for example, as depicted in FIG. 1. For example, the terminal 500 may include a display screen 510. The display screen 510 may be configured to display the first, second and third poker hands as depicted in FIGS. 2 to 4. The display screen 510 may be configured to display the payout structure as depicted in FIG. 5. Alternatively, the payout structure may be displayed on a body of the terminal 500. Alternatively, the payout structure may be communicated to a player in an alternative manner.

The terminal 500 may include an input module 508. The input module 508 may be a set of buttons accessible to the player. Alternatively, the input module 508 may be a touch screen display. In this example embodiment, the display screen 510 and the input module 508 will be the same touch screen display.

The terminal 500 may include a play log 502, a terminal record 504 and a payout structure 506. The payout structure 506 may be similar to the payout structure depicted in FIG. 5. The play log 502 may be as depicted in FIGS. 7*a* and 7*b*. The terminal record 504 may be as depicted in FIGS. 8*a* and 8*b*.

It will be appreciated that the terminal 500 may be a conventional video game terminal. For example, the video game terminal may be configured to simulate a game of video poker. Alternatively, the video game terminal may be configured to simulate a variety of other wagering games. For example, the video game terminal may be configured to simulate a slot machine, a blackjack game, a Texas hold-'em poker game, an Omaha poker game, or a craps game.

In an alternative embodiment, the processor may be located at a server, while the remaining features are located in a terminal. The terminal may be in communication with the server over a network. For example, the network may be the Internet. The communications may be encrypted or otherwise protected by security measures.

FIG. 7*a* illustrates an example play log structure, in accordance with an example embodiment of the present invention. The play log 502 as depicted in FIG. 6 may be stored as a play log structure 700. The play log structure 700 may include a set of records 702, each record 702 representing one wager or play in the wagering game.

It will be appreciated that the play log structure 700 may be stored in a variety of ways. For example, it may be stored as a tab delimited or comma delimited flat file, in a relational database or another storage method accessible to a lottery host. The play log structure 700 may be used for accounting, auditing, or fraud-detection purposes. For example, the play log structure 700 may be checked for abnormally high concentration of prizes being awarded during a particular time of day or to a particular player or set of players.

FIG. 7*b* illustrates an example play log structure entry, in accordance with an example embodiment of the present invention. Each game ticket information structure entry may be a record 702'Each record 702' may contain a variety of information, such as a Play ID 704. For example, each play or wager conducted in a wagering game may be associated an identifier. The Play ID 704 may facilitate sorting or searching through the play log structure 700. The identifier may be an alpha-numeric sequence of characters.

The record 702' may also include a Terminal ID 706. The Terminal ID 706 may be an identifier associated with a terminal where the wager was placed. For example, the Terminal ID 706 may be an identifier including an alpha-numeric sequence of characters. In an alternative embodiment, the Terminal ID 706 may be a text description of the terminal.

The record 702' may also include a Player ID 708. The Player ID 708 may be an identifier associated with the player placing the wager. Each player may be associated with an identifier, for example, a frequent player number. Alternatively, player information may be obtained from a credit card or debit card used to find the wager. If no player information is available, the Player ID 708 field may be left blank. The Player ID 708 may be an alpha-numeric sequence of characters.

The record 702' may also include a Hand ID 710. The Hand ID 710 may be associated with the three poker hands dealt to the player during a game. Each hand dealt in the game may be associated with its own identifier. The identifier may be an alpha-numeric sequence of characters.

The record 702' may also include date the wager was made 712. For example, the date the wager was made may be when the player first made the wager, when the player's payment was received, or when the predetermined payout award is awarded.

The record 702' may also include a predetermined prize award 714. For example, the predetermined prize award 714 may be a dollar amount of a payout award. Alternatively, the predetermined prize award 714 may be a descriptor or identifier associated with a merchandise prize or other prize.

FIG. 8*a* illustrates an example terminal structure, in accordance with an example embodiment of the present invention. The terminal record 504 as depicted in FIG. 6 may be stored as a terminal structure 800. The terminal structure 800 may include a set of records 802, each record 802 representing one terminal.

It will be appreciated that the terminal structure 800 may be stored in a variety of ways. For example, it may be stored as a tab delimited or comma delimited flat file, in a relational database or another storage method accessible to a lottery host. The terminal structure 800 may be used for accounting, auditing, or fraud-detection purposes.

FIG. 8*b* illustrates an example terminal structure entry, in accordance with an example embodiment of the present invention. Each terminal structure entry may be a record 802'. Each record 802' may contain a variety of information, such as a Terminal ID 804. For example, each terminal may be associated an identifier. The Terminal ID 804 may facilitate sorting or searching through the terminal structure 800. The identifier may be an alpha-numeric sequence of characters.

The record 802' may also include a Terminal Type 806. The Terminal Type 806 may be an identifier associated with a type of terminal. For example, the Terminal Type 806 may be an identifier including an alpha-numeric sequence of characters. In an alternative embodiment, the Terminal Type 806 may be a text description of the terminal type.

The record 802' may also include a location 808. The location 808 may be an identifier associated with a location of the terminal. For example, the Location 808 may be an identifier including an alpha-numeric sequence of characters. In an alternative embodiment, the Location 808 may be a text description of the terminal location.

The record 802' may also include date the terminal was installed 810. For example, the date the terminal was installed may be the date the terminal was physically moved to the location or the date the terminal was activated. The date may also include a field for the time the terminal was installed.

Figure 9:
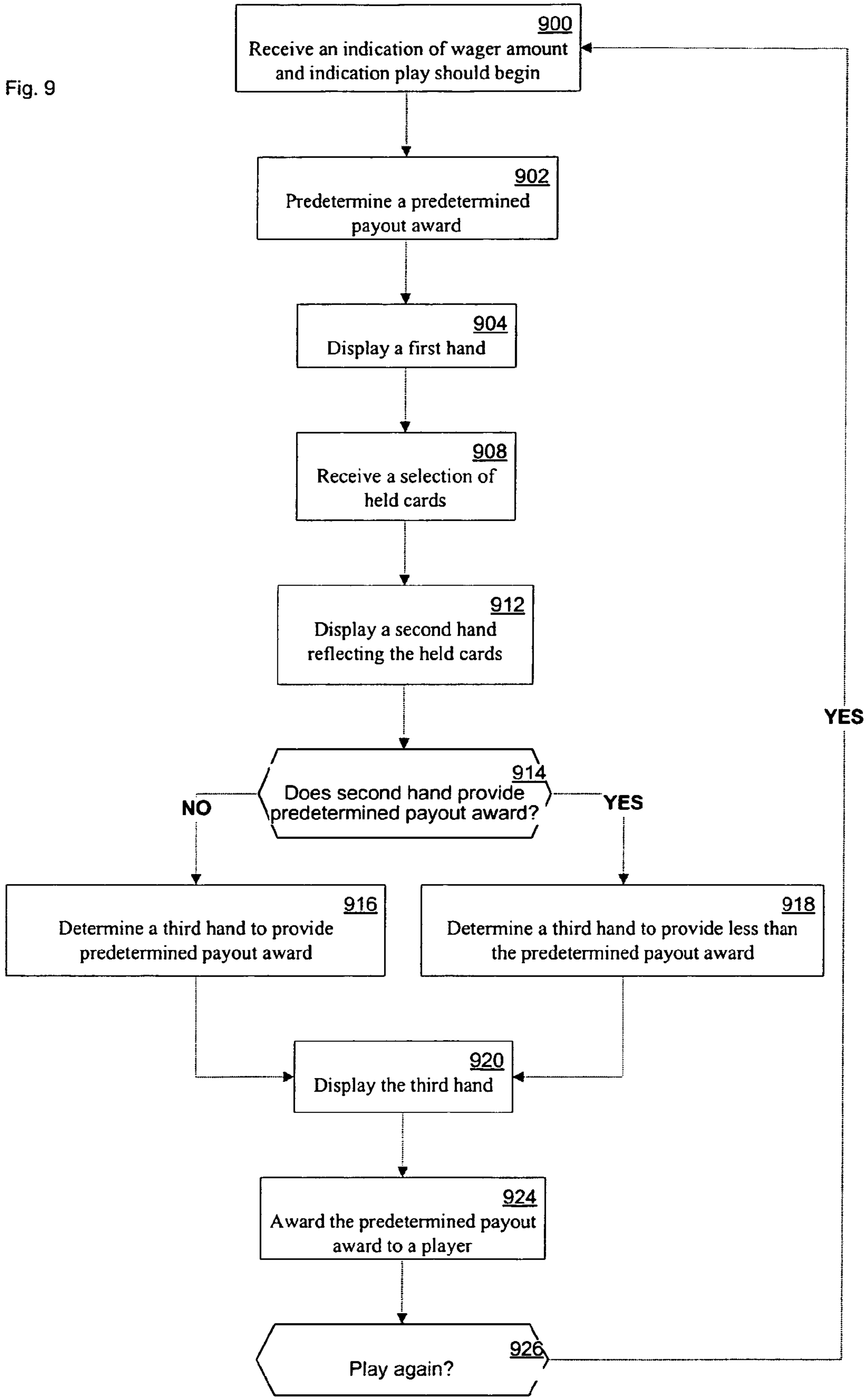
FIG. 9 illustrates an example procedure for conducting a wagering game, in accordance with an example embodiment of the present invention.

FIG. 9 illustrates an example procedure for conducting a wagering game, in accordance with an example embodiment of the present invention. For example, the procedure may occur at a video gaming terminal as depicted in FIG. 1. Alternatively, the procedure may occur over a network, such as the Internet, or in another manner. In 900, an indication of a wager amount and an indication that play should begin may be received. For example, a player may use input modules on the video gaming terminal to indicate a wager amount and an indication to begin play.

A wager may also be accepted from the player. At least one payout structure, as depicted in FIG. 5, may also be communicated to the player. The payout structure may include a set of payout awards.

In 902, a predetermined payout award may be predetermined. For example, the predetermined payout award may be predetermined before a player submits any choices. For example, player choices may be a selection of held cards described in 908. The payout award may be determined by looking up a payout structure including a list of prizes that must be awarded. The payout award may alternatively be determined randomly or randomly subject to a set of rules. The payout award may be predetermined to satisfy statutory or regulatory requirements that an outcome of a wager must be known before a player begins playing.

For example, the predetermined payout award may be predetermined at a server. The predetermined payout award may then be sent to a video gaming machine, as depicted in FIG. 1. For example, the server may pull a ticket from a ticket pool to determine the predetermined payout award. For example, the server may pull a prize from a prize pull to determine the predetermined payout award.

The predetermined payout award may be zero. That is, the player may win no award for his wager.

In 904, a first hand may be displayed to a player. The first hand may include a set of cards. For example, the first hand may consist of five cards dealt from a standard 52-card deck. The first hand may be displayed on a display screen of a video poker terminal. The display screen may be configured to display a screen shot as depicted in FIG. 2.

In 908, a selection of held cards may be accepted. The selection may be received through a video poker terminal. For example, the video poker terminal may include input modules such as buttons allowing a player to designate which cards displayed on the display screen to hold. Alternatively, the display screen may be a touch screen and allow a player to touch displayed cards to be held. The display screen may be configured to display a screen shot as depicted in FIG. 3. Cards designated to be held may be indicated as held cards.

In 912, a second hand may be displayed to a player. The second hand may include a set of cards including replacement cards and the selection of held cards received in 908. The replacement cards replace the cards not selected to be held. The cards not selected to be held are discarded. The replacement cards may be dealt from the same standard 52-card deck as 904.

In 914, the procedure may test if the second hand provides the predetermined payout award. If yes, the procedure proceeds to 918. If no, the procedure proceeds to 916.

Alternatively, 914 may also check whether the predetermined payout award should be provided by the third hand. For example, the wagering game may be configured so that a fixed percentage of predetermined payout awards are associated with the third hand.

In 916, a third hand may be determined. The third hand may be determined to be the poker hand that provides the predetermined payout award. For example, the predetermined payout award of step 900 may be 75 units after the player submitted a 3 unit bet. A poker hand of four of a kind is required to provide the predetermined payout award. If the second hand is not a four of a kind, then the third hand must be a four of a kind in order to provide the predetermined payout award to the player.

To make it appear more like a real card game, the first hand and the replacement cards of the second hand may sometimes be unable to provide the predetermined payout award. In these cases, the third hand will always provide the predetermined payout award. These cases may prevent the player from believing the third hand is used to correct for poor player selection of held cards in the first hand. These cases may occur in a fixed percentage of hands played on the video poker terminal. The fixed percentage may be from 0% to 100%. For example, the fixed percentage may be 25%.

The procedure proceeds to 920.

In 918, a third hand may be determined to provide less than the predetermined payout award. For example, the wagering game may only award a prize for a highest hand selected from the second hand and the third hand. For example, if the predetermined award requires a four of a kind as the second or the third hand, and the second hand is a four of a kind, the third hand can be determined to be any hand with a lower poker hand value. In 920, the third hand may be displayed. The third hand may be displayed above the second hand on the display screen of the video poker terminal as depicted in FIG. 4. One of the second hand and the third hand may provide the predetermined payout award. The hand providing the predetermined payout award may be highlighted.

Alternatively, the third hand may be determined to not provide the predetermined payout award.

In 924, the predetermined payout award may be awarded to the player. For example, the video poker terminal may include a dispenser where a receipt or currency may be dispensed. If the dispenser dispenses a receipt, the receipt may be redeemed for cash at a designated location, such as a cashier in a casino.

In 926, the player may be presented with a choice of playing again. For example, the player may indicate his choice on the input module. If the player chooses to play again, the procedure proceeds to 900. If the player chooses to not play again, the procedure may end.

Figure 10:
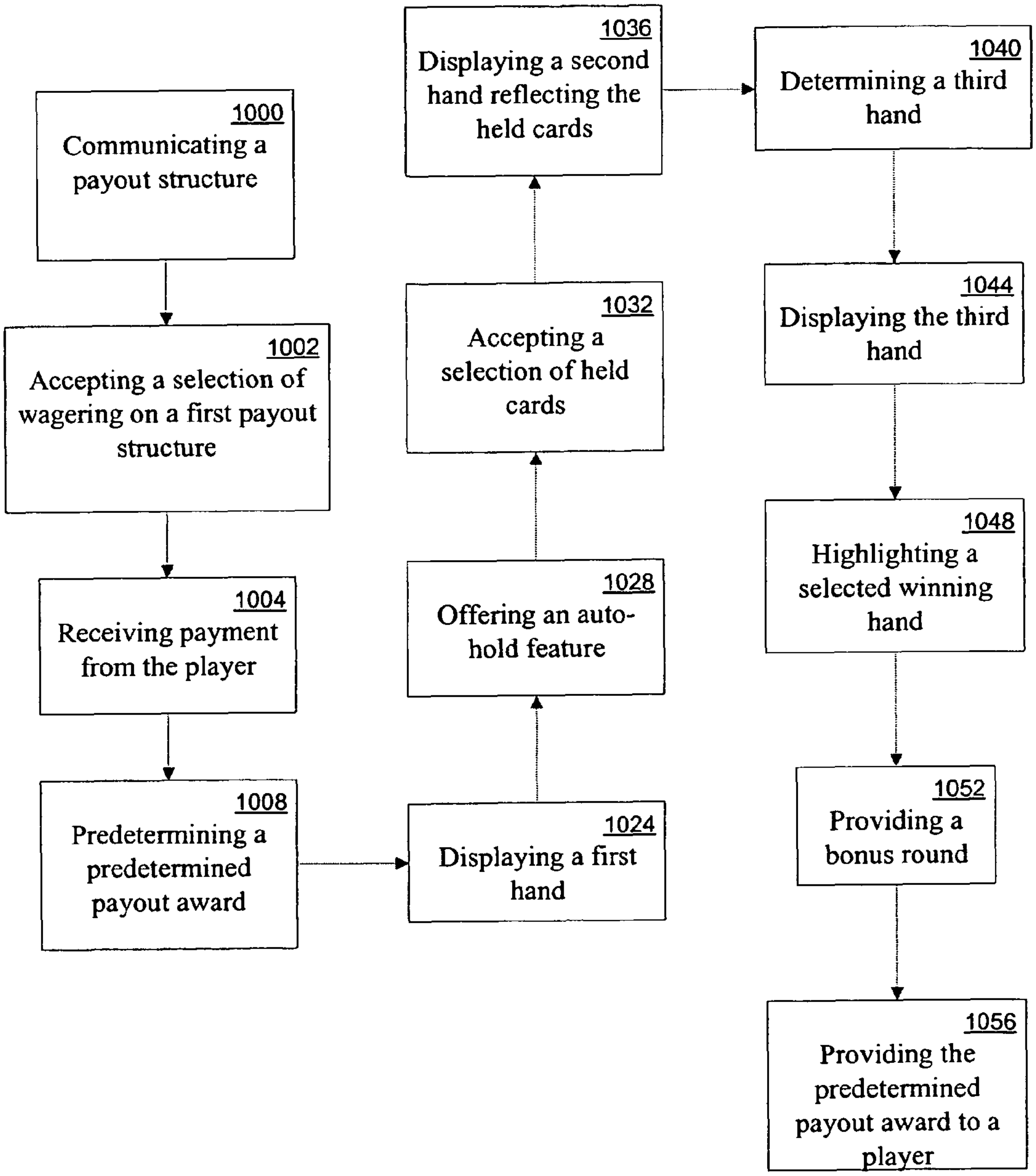
FIG. 10 illustrates a second example procedure for conducting a wagering game, in accordance with another example embodiment of the present invention.

FIG. 10 illustrates a second example procedure for conducting a wagering game, in accordance with another example embodiment of the present invention.

In 1000, one payout structure may be communicated to the player. Each payout structure may be similar to the payout structure depicted in FIG. 5. Each payout structure may include a set of payout entries.

A variety of modifications may be made to the first payout structure to provide variety and inspire player interest in playing. For example, a video poker machine may be configured to accept all deuce cards as wild cards. That is, a deuce in a poker hand may be treated as any valued card, increasing a player's opportunity to win.

Similarly, the first hand and the third hand may be dealt from standard 52-card decks plus a joker. The joker may be treated as a wild card.

Similarly, the payout structure may be configured to only provide an award if the second or the third hand include at least a pair of jacks or better. No award is provided for lesser hands.

In 1002, one or more wagers may be accepted from the player. A wager may be made on a payout structure. A payout structure may include the value of a set of poker hands along with winnings to be paid for each one of different wagers.

In 1004, a payment may be received from the player. The payment may be made by cash, currency, credit card, debit card, or other methods. A lump sum payment may be made which gives the player a credit balance which he can draw from as he plays at the video poker terminal. Alternatively, a player may play on credit and pay for any losses incurred after he finishes playing.

In 1008, a predetermined payout award may be predetermined. The payout award may be determined by looking up a payout structure including a list of prizes that must be awarded. The payout award may alternatively be determined randomly or randomly subject to a set of rules (semi-randomly). The payout award may be predetermined to satisfy statutory or regulatory requirements that an outcome of a wager must be known before a player begins playing.

The payout award may be associated with a first payout structure that the player wagered on in 1004. Thus, the first payout structure must include an entry providing the payout award given a player's first wager and a poker hand.

The predetermined payout award may be zero. That is, the player may win no award for his wager.

In 1024, a first hand may be displayed to a player. The first hand may include a set of cards. For example, the first hand may consist of five cards dealt from a standard 52-card deck. The first hand may be displayed on a display screen of a video poker terminal. The display screen may be as depicted in FIG. 2.

In 1028, an auto-hold feature may be offered. The auto-hold feature may automatically select optimal held cards from the first hand. That is, the auto-hold feature may provide a selection of held cards that maximizes a player's chance of winning a prize.

If the player accepts the selection suggested by the auto-hold feature, the payout structures of 1000 and 1001 may be altered to provide a lower payout award. This is to award players who are knowledgeable in video poker strategy.

Alternatively, the auto-hold feature may be offered before the player places a wager. The payout award or awards may then be determined before the player places a wager, thus guaranteeing the outcome of the game.

In 1032, a selection of held cards may be accepted. The selection may be received through a video poker terminal. For example, the video poker terminal may include input modules such as buttons allowing a player to designate which cards displayed on the display screen to hold. Alternatively, the display screen may be a touch screen and allow a player to touch displayed cards to be held. The display screen may be as depicted in FIG. 3. Cards designated to be held may be indicated as held cards.

In 1036, a second hand may be displayed to a player. The second hand may include a set of cards including replacement cards and the selection of held cards received in 908. The replacement cards replace the cards not selected to be held. The cards not selected to be held are discarded. The replacement cards may be dealt from the same standard 52-card deck as 904.

In 1040, a third hand may be determined. If the second hand provides the predetermined payout award of step 1008 and the second predetermined payout award of step 1012, the third hand may be a random poker hand dealt from a second standard 52-card deck. If the second hand does not provide the predetermined payout award and the second predetermined payout award, the third hand may be determined to be the poker hand that provides the predetermined payout award. 1040 is similar to 916 of FIG. 9, discussed above.

In 1044, the third hand may be displayed. The third hand may be displayed above the second hand on the display screen of the video poker terminal. One of the second hand and the third hand may provide the predetermined payout award. The hand providing the predetermined payout award may be highlighted. The display screen may be as depicted in FIG. 4.

In 1048, one of the second hand and the third hand may be a highlighted hand. The hand providing the predetermined payout award and the second predetermined payout award may be highlighted. It will be appreciated that if more than payout structures are used, the highlighted hand will provide the predetermined payout award for each of the payout structures.

In 1052, a bonus round may be offered. The bonus round may be offered if a bonus trigger is detected. For example, the bonus trigger may be the first hand or the third hand including at least three aces. The bonus round may trigger a random win multiplier. For example, the random win multiplier may be 2, 3 or 4. The bonus round may include eight free hands provided to the player. Each hand may be played as discussed above with a first hand, a second hand and a third hand. Any winnings earned during the bonus round may be multiplied by the random win multiplier.

In 1056, the predetermined payout award may be provided to the player. For example, the video poker terminal may include a dispenser where a receipt or currency may be dispensed. If the dispenser dispenses a receipt, the receipt may be redeemed for cash at a designated location, such as a cashier in a casino. It will be appreciated that if there were more than two predetermined payout awards, the remaining predetermined payout awards may also be provided at this time.

Figure 11:
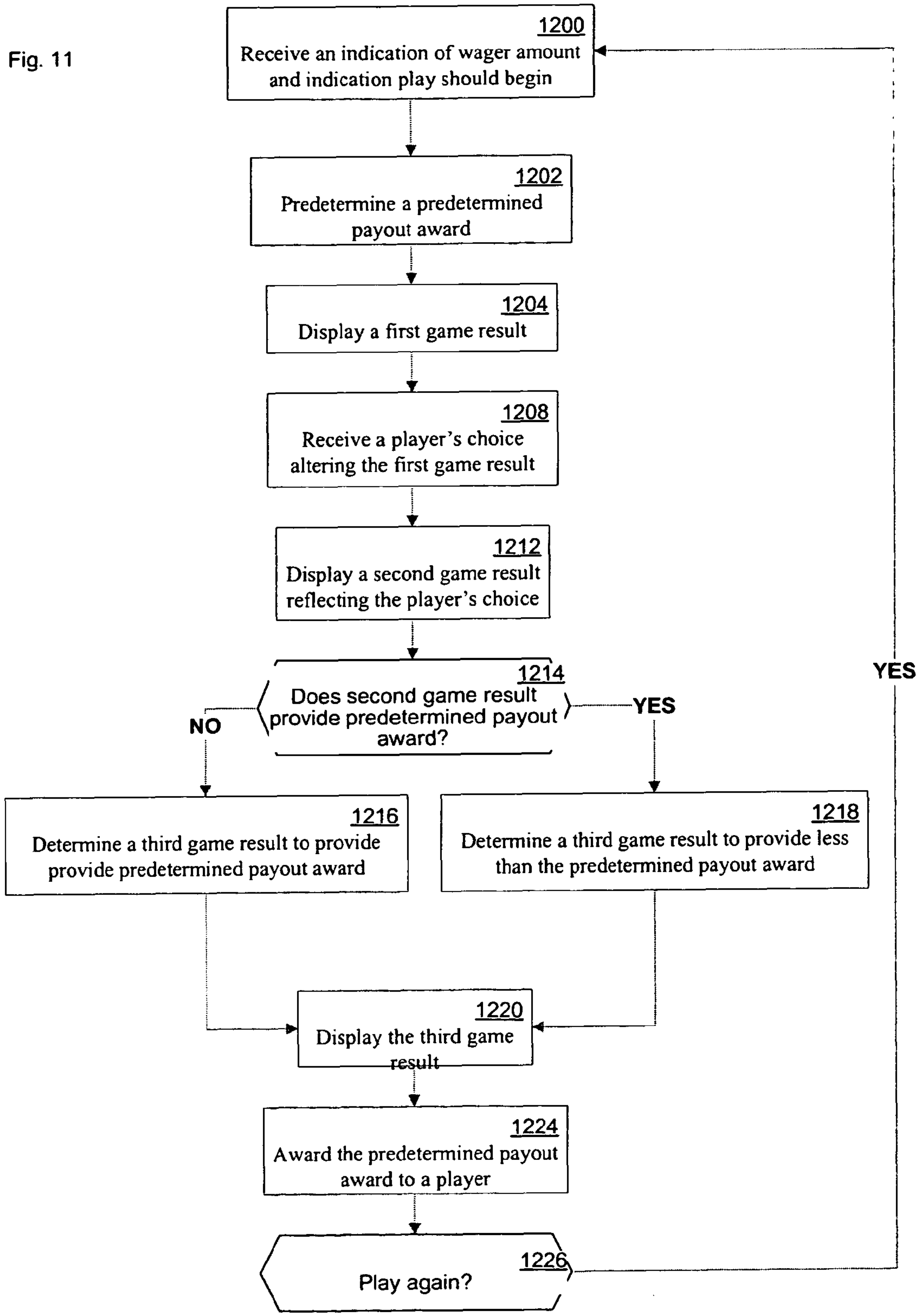
FIG. 11 illustrates a third example procedure for conducting a wagering game, in accordance with another example embodiment of the present invention.

FIG. 11 illustrates a third example procedure for conducting a wagering game, in accordance with another example embodiment of the present invention. For example, the procedure may occur at a video gaming terminal as depicted in FIG. 1. Alternatively, the procedure may occur over a network, such as the Internet, or in another manner. In 1200, an indication of a wager amount and an indication that play should begin may be received. For example, a player may use input modules on the video gaming terminal to indicate a wager amount and an indication to begin play.

In 1202, a predetermined payout award may be predetermined. The payout award may be determined by looking up a payout structure including a list of prizes that must be awarded. The payout award may alternatively be determined randomly or randomly subject to a set of rules. The payout award may be predetermined to satisfy statutory or regulatory requirements that an outcome of a wager must be known before a player begins playing.

The predetermined payout award may be zero. That is, the player may win no award for his wager.

A wager amount may also be accepted from the player. At least one payout structure, as depicted in FIG. 5, may also be communicated to the player. The payout structure may include a set of payout awards.

In 1204, a first game result may be displayed to a player. The first game result may be displayed on a display screen of a video gaming terminal. The first game result may be a representation of conventional wagering game pieces. For example, the first game result may be two cards dealt face up as a virtual blackjack hand, or an opportunity to place bets in a virtual craps game.

In 1208, a player's choice altering the first game result may be accepted. If the first game result is a virtual blackjack hand, a player's choice may be to hit, stay, double down, split, or another conventional blackjack choice. If the first game result is a virtual craps game, the player's choice may be a selection of bets made. The player's choice may be accepted a video gaming terminal. For example, the video gaming terminal may include input modules. Alternatively, the display screen may be a touch screen In 1212, a second game result may be displayed to a player. The second game result may reflect the first game result and the player's choice received in 1208. For example, if the first game result is a virtual blackjack game, the second game result will reflect the player's choice in 1208 of hitting, staying, doubling down, or splitting his cards. For example, if the first game result is a virtual craps game, the second game result may be a dice outcome and winnings that correspond to the player's choice of bets made.

In 1214, the procedure may test if the second game result provides the predetermined payout award. The predetermined payout award may be a specified monetary award. The procedure may check whether the second game result provides the specified monetary award. If yes, the procedure proceeds to 1218. If no, the procedure proceeds to 1216.

Alternatively, 1214 may also check whether the predetermined payout award should be provided by the third game result. For example, the wagering game may be configured so that a fixed percentage of predetermined payout awards are associated with the third game result.

In 1216, a third game result may be determined. The third game result may be determined to provide the predetermined payout award. For example, if the predetermined payout award is a specified monetary award, the third game result may be determined so it awards the specified monetary award. The procedure proceeds to 1220.

In 1218, a third game result may be determined to provide less than the predetermined payout award. If the second game result awards the predetermined payout award, the third game result may be determined so that it does not provide the predetermined payout award, or any other award associated with the payout structure. For example, the wagering game may only pay out an awarded for the highest award associated with the second game result and the third game result.

In 1220, the third game result may be displayed. The third game result may be displayed above the second game result on the display screen of the video gaming. One of the second game result and the third game result may provide the predetermined payout award. The game result providing the predetermined payout award may be highlighted.

In 1224, the predetermined payout award may be awarded to the player. For example, the video gaming terminal may include a dispenser where a receipt or currency may be dispensed. If the dispenser dispenses a receipt, the receipt may be redeemed for cash at a designated location, such as a cashier in a casino.

In 1226, the player may be presented with a choice of playing again. For example, the player may indicate his choice on the input module. If the player chooses to play again, the procedure proceeds to 1200. If the player chooses to not play again, the procedure may end.

Figure 12:
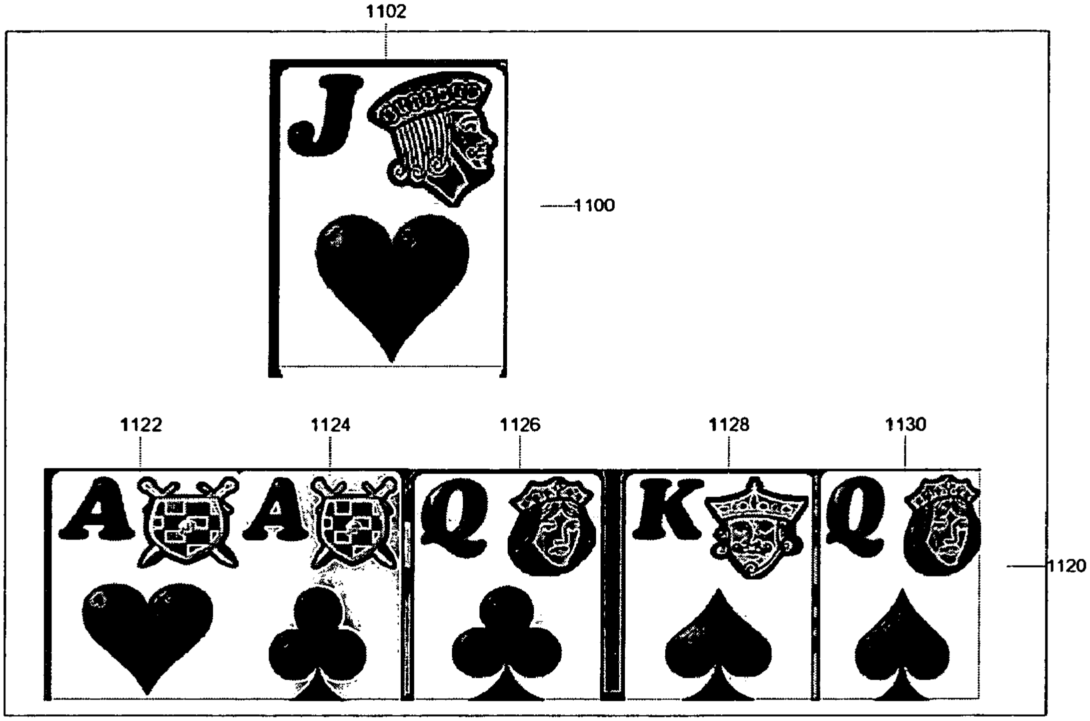
FIG. 12 illustrates an example second poker hand and an example supplemental game result, in accordance with another example embodiment of the present invention.

FIG. 12 illustrates an example second poker hand and an example supplemental game result, in accordance with another example embodiment of the present invention. For example, second hand 1120 includes cards 1122, 1124, 1126, 1128 and 1130. For example, the second hand 1120 may be a result of a first hand (not depicted) minus a set of discard cards plus a set of replacement cards, similar to FIGS. 2, 3, and 4.

A supplemental game result 1100 may be displayed as well in place of the third hand. For example, a supplemental game may be a high/low game, where the object is to draw a single card from a standard 52-card deck and the prize may be awarded based on the card. The supplemental game result 1100 may act similar to the third hand and provide a predetermined award regardless of a player's choice of held cards.

It will be appreciated that other games may also be used as the supplemental game. For example, a video roulette game may be used as the supplemental game.

It will be appreciated that the above description may also apply to a video slot machine. A video slot machine game may include player choices, for example, which reels to hold still during a second spin. The video slot machine may also implement the supplemental game result in order to guarantee a payout award regardless of a player's choice.

MODIFICATIONS

In the preceding specification, the present invention has been described with reference to specific example embodiments thereof. It will, however, be evident that various modifications and changes may be made thereunto without departing from the broader spirit and scope of the present invention as set forth in the claims that follow. The specification and drawings are accordingly to be regarded in an illustrative rather than restrictive sense.

The invention claimed is:

1. A computer-implemented method of conducting a wagering game having at least one step performed by a processor, comprising:

predetermining a predetermined payout award;

displaying a first hand, the first hand comprising a first plurality of cards; accepting a selection of held cards selected from the first hand;

displaying a second hand, the second hand comprising a second plurality of cards including the held cards;

determining, using the processor, a third hand, the third hand comprising a third plurality of cards selected so that at least one of the second hand and the third hand provides the predetermined payout award, wherein, if the second hand provides the predetermined payout award the third hand is determined to not provide the predetermined payout award and if the second hand does not provide the predetermined payout award the third hand is determined to provide the predetermined payout award;

displaying the third hand; and awarding the predetermined payout award to a player.

2. A method of claim 1, further comprising:

communicating a payout structure to the player, the payout structure including at least one payout structure entry associated with a payout award, wherein the predetermined payout award is selected from a payout structure entry.

3. A method of claim 1, further comprising: highlighting a winning hand selected from the second hand and the third hand.

4. A method of claim 1, wherein the wagering game is a video poker game.

5. A method of claim 1, wherein a winning hand is selected from one of the second hand and the third hand and the winning hand's poker hand value is higher than a non-winning hand's poker hand value.

6. A method of claim 1, further comprising:

determining the first hand, the first hand unable to provide a payout award higher than the predetermined payout award for any selection of held cards.

7. A method of claim 1, further comprising: receiving a payment from the player.

8. A method of claim 1, further comprising: receiving an indication of a desire to play the wagering game from the player.

9. A method of claim 1, further comprising: providing a bonus round in the wagering game as the predetermined payout award.

10. A method of claim 1, wherein a fixed percentage of the predetermined payout awards are awarded by the third hand.

11. A method of claim 1, wherein the third hand is determined at a server, and the first hand, the second hand, and the third hand are displayed at a terminal.

12. A method of claim 11, wherein the terminal is a personal computer and is in communication with the server over the Internet.

13. The method of claim 1, wherein the predetermining is performed at a server, the displaying is performed at a terminal in communication with the server, and the awarding is performed at the terminal.

14. The method of claim 1, wherein the first plurality of cards is selected from a first deck of cards and the third plurality of cards is selected from a second deck of cards.

15. A computer-implemented method of conducting a wagering game having at least one step performed by a processor, comprising:

predetermining a predetermined payout award;

displaying a first game result;

accepting a player's choice altering the first game result;

displaying a second game result, the second game result incorporating the player's choice;

determining, using the processor, a third game result so that at least one of the second game result and the third game result provides the predetermined payout award wherein, if the second game result provides the predetermined payout award the third game result is determined to not provide the predetermined payout award and if the second game result does not provide the predetermined payout award the third game result is determined to provide the predetermined payout award;

displaying the third game result; and awarding the predetermined payout award to a player.

16. A method of claim 15, further comprising:

communicating a payout structure to the player, the payout structure including at least one payout structure entry associated with a payout award, wherein the predetermined payout award is selected from a payout structure entry.

17. A method of claim 15, further comprising:

determining the first game result, the first game result unable to provide a payout award higher than the predetermined payout award for any player's choice.

18. A method of claim 15, further comprising:

receiving a wager amount in a currency equivalent from the player.

19. A method of claim 15, further comprising:

receiving an indication of a desire to play the wagering game from the player.

20. A method of claim 15, wherein the third game result is determined at a server, and the first game result, the second game result, and the third game result are displayed at a terminal.

21. A method of claim 20, wherein the terminal is a personal computer and is in communication with the server over the Internet.

22. An apparatus for conducting a wagering game, comprising:

a display, the display configured to display a payout structure, a first poker hand, a second poker hand, and a third poker hand;

an input module, the input module configured to receive a player's indication of a desire to play the wagering game and a player's selection of held cards selected from the first poker hand; and a processor, the processor configured to, choose a payout structure entry associated with a predetermined payout award, determine the first poker hand, determine the second poker hand from the first poker hand and the selection of held cards, determine the third poker hand so that at least one of the second poker hand and the third poker hand provides the predetermined payout award associated with the payout structure entry, wherein, if the second hand provides the predetermined payout award the third hand is determined to not provide the predetermined payout award and if the second hand does not provide the predetermined payout award the third hand is determined to provide the predetermined payout award, and awarding the predetermined payout award to the player.

23. The apparatus of claim 22, further comprising:

a dispenser, the dispenser configured to dispense the predetermined payout award.

24. The apparatus of claim 22, where the payout structure further comprises at least one payout structure entry, each payout structure entry associated with a payout award.

25. The method of claim 22, wherein the first poker hand is selected from a first set of cards and the third poker hand is selected from a second set of cards.

26. An apparatus for conducting a wagering game, comprising:

a payout structure, the payout structure further including at least one payout structure entry, each payout structure entry associated with a payout award;

a display, the display configured to display the payout structure, a first game result, a second game result, and a third game result;

an input module, the input module configured to receive a player's indication of a desire to play the wagering game and a player's choice; and a processor, the processor configured to, choose a payout structure entry from the payout structure, determine the first game result, determine the second game result from the first game result and the player's choice, and determine the third game result so that at least one of the second game result and the third game result provides a predetermined payout award wherein, if the second game result provides the predetermined payout award the third game result is determined to not provide the predetermined payout and if the second game result does not provide the predetermined payout award the third game result is determined to provide the predetermined payout award.

27. The apparatus of claim 26, further comprising: a dispenser, the dispenser configured to dispense the predetermined payout award.

28. The apparatus of claim 26, where the payout structure further comprises at least one payout structure entry, each payout structure entry associated with a payout award.

29. A non-transitory computer-readable medium storing instructions adapted to be executed by a processor, the instructions, when executed, causing the processor to perform the method of claim 1.

30. A computer-implemented method of conducting a wagering game having at least one step performed by a processor, comprising:

displaying a first hand, the first hand comprising a first plurality of cards; accepting a selection of held cards selected from the first hand;

displaying a second hand, the second hand comprising a second plurality of cards including the held cards;

displaying a third hand comprising a third plurality of cards selected, using a processor, such that if the second hand provides the predetermined payout award the third hand is determined to not provide the predetermined payout award and if the second hand does not provide the predetermined payout award the third hand is determined to provide the predetermined payout award; and awarding a payout award to a player, the payout award associated with a highest poker hand value of the second hand and the third hand.

31. The method of claim 30, wherein the first plurality of cards is selected from a first set of cards and the third plurality of cards is selected from a second set of cards.

32. A computer-implemented method of conducting a wagering game, having at least one step performed by a processor comprising:

predetermining a predetermined payout award;

displaying a first hand, the first hand comprising a first plurality of cards; accepting a selection of held cards selected from the first hand;

displaying a second hand, the second hand comprising a second plurality of cards including the held cards;

determining, using a processor, a third hand, the third hand comprising a third plurality of cards selected so that one of the prizes for the second hand, or a combination of prizes awarded for the second and third hands provides the predetermined payout award wherein if the second hand provides the predetermined payout award the third hand is determined to not provide the predetermined payout award and if the second hand does not provide the predetermined payout award the third hand is determined to provide the predetermined payout award in combination with the second hand;

displaying the third hand; and awarding the predetermined payout award to a player.

33. The method of claim 32, wherein the first plurality of cards is selected from a first set of cards and the third plurality of cards is selected from a second set of cards.

* * * * *